(12) United States Patent
Chae et al.

(10) Patent No.: US 11,260,542 B2
(45) Date of Patent: Mar. 1, 2022

(54) UNIVERSAL VACUUM CUP AND METHOD OF LIFTING AN OBJECT

(71) Applicant: GM GLOBAL TECHNOLOGY OPERATIONS LLC, Detroit, MI (US)

(72) Inventors: HyungMin Chae, Novi, MI (US); Wonhee M. Kim, Royal Oak, MI (US); Dooil Hwang, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 176 days.

(21) Appl. No.: 16/669,827

(22) Filed: Oct. 31, 2019

(65) Prior Publication Data
US 2021/0129353 A1 May 6, 2021

(51) Int. Cl.
*B25J 15/06* (2006.01)
*B25B 11/00* (2006.01)

(52) U.S. Cl.
CPC ......... *B25J 15/0683* (2013.01); *B25B 11/007* (2013.01)

(58) Field of Classification Search
CPC . B25J 15/0023; B25J 15/0683; B66C 1/0231; B25B 11/007
See application file for complete search history.

(56) References Cited

U.S. PATENT DOCUMENTS

| | | | | |
|---|---|---|---|---|
| 3,640,562 A | * | 2/1972 | Creskoff | B66C 1/0281 294/65 |
| 4,023,845 A | * | 5/1977 | Schnebly | B66C 1/0212 294/189 |
| 4,294,424 A | * | 10/1981 | Teissier | B25B 11/007 248/205.9 |
| 4,561,686 A | * | 12/1985 | Atchley | B66C 1/0206 294/188 |
| 6,502,808 B1 | * | 1/2003 | Stone | B23B 31/307 269/21 |
| 7,637,201 B2 | | 12/2009 | Lin | |
| 8,087,845 B2 | | 1/2012 | Lin et al. | |

(Continued)

OTHER PUBLICATIONS

U.S. Appl. No. 16/178,040, titled "Variable Friction Cargo Surface System for Vehicles," filed Nov. 1, 2018 by GM Global Technology Operations LLC.

(Continued)

*Primary Examiner* — Dean J Kramer
(74) *Attorney, Agent, or Firm* — Lorenz & Kopf LLP

(57) ABSTRACT

A vacuum cup assembly and a method of lifting an object are provided. The vacuum cup assembly includes a cup structure defining an opening at a proximal end, a recess at a distal end, and a cavity region between the proximal and distal ends, where the cavity region includes at least one cavity. The opening is in fluid communication with the recess and with the cavity region. Inner structures are disposed in the cavity region. The inner structures are configured to hold the cup structure in a gripping position when a negative pressure is applied to the cavity region through the opening in the cup structure. The cup structure is configured to be in a resting position without the negative pressure being applied to the cavity region. The vacuum cup assembly has a first shape in the resting position and a second shape in the gripping position.

17 Claims, 5 Drawing Sheets

(56) References Cited

U.S. PATENT DOCUMENTS

| | | | |
|---|---|---|---|
| 8,177,607 B2* | 5/2012 | Herbin | B25B 11/007 |
| | | | 451/384 |
| 8,548,626 B2 | 10/2013 | Steltz et al. | |
| 8,702,340 B2 | 4/2014 | Lin et al. | |
| 2015/0336227 A1 | 11/2015 | McKay et al. | |
| 2019/0106030 A1 | 4/2019 | Kim et al. | |
| 2019/0106916 A1 | 4/2019 | Sutherland et al. | |
| 2019/0217484 A1* | 7/2019 | Takahashi | B25J 15/12 |
| 2019/0240813 A1* | 8/2019 | Nakayama | B25J 15/0683 |

OTHER PUBLICATIONS

U.S. Appl. No. 16/564,777, titled "Pneumatic Articulating Structure System with Internal Tile Architecture," filed Sep. 6, 2019 by GM Global Technology Operations LLC.

U.S. Appl. No. 16/654,292, titled "Selectively Rigidizable Membrane," filed Oct. 16, 2019 by GM Global Technology Operations LLC.

Jaiswal et al., Vacuum Cup Grippers for Material Handling in Industry, International Journal of Innovative Science, Engineering & Technology, Jun. 2017, pp. 187-194, vol. 4 Issue 6.

Kim et al., A Novel Layer Jamming Mechanism with Tunable Stiffness Capability for Minimally Invasive Surgery, IEEE Transactions on Robotics, Aug. 2013, pp. 1031-1042, vol. 29, No. 4.

* cited by examiner

UNIVERSAL VACUUM CUP AND METHOD OF LIFTING AN OBJECT

FIELD

The present disclosure relates to a vacuum cup assembly for lifting objects and a method of lifting objects using the vacuum cup assembly.

INTRODUCTION

Vacuum cups may be used to lift objects in automotive assembly plants. Typical designs include a flat vacuum cup formed of a rigid material and a bellows vacuum cup that includes a flexible accordion-style end.

Because of their rigidity, flat vacuum cups only work with flat objects that they can form a seal with, in order to apply the vacuum pressure. In addition, because of their inflexibility, different flat vacuum cups may be required for different objects. In other applications, a handling system for automotive parts must be reconfigured for different part handling by adjusting the angle of the vacuum cup connector. Thus, at least parts of the lifting system need to be reconfigured to adapt to objects having different geometries.

Bellows vacuum cups have more flexibility than flat vacuum cups. However, the the inner components of the bellows vacuum cups may damage the object being lifted because the bellows are flexible, and rigid inner parts of the bellows vacuum cup may be pressed into the object without the bellows portion providing any protection.

Due to the drawbacks of existing vacuum cups, other systems of lifting object may be used instead of vacuum cups, adding cost and complexity. Accordingly, there is a need for improved lifting systems that do not add significant cost and complexity.

SUMMARY

The present disclosure provides a smart universal vacuum cup that uses a layer jamming concept to vary the stiffness of the vacuum cup. Inner structures are disposed in one or more cavities inside the vacuum cup, and when the negative pressure is applied to the cavity or cavities, the inner structures are compressed together, which increases the rigidity of the vacuum and its ability to grip an object and/or increases the force to lock the cup's position. Therefore, the inner structures are flexible in an initial position, where negative pressure is not applied, and the vacuum cup assembly including the inner structures becomes stiffer and conforms to the object being lifted when negative pressure is applied.

In one form, which may be combined with or separate from the other forms disclosed herein, a vacuum cup assembly is provided that includes a cup structure defining an opening at a proximal end and a recess at a distal end. The cup structure defines a cavity region between the proximal and distal ends, where the cavity region includes at least one cavity. The opening is in fluid communication with the recess and with the cavity region. A plurality of inner structures is disposed in the cavity region. The plurality of inner structures is configured to hold the cup structure in a gripping position when at least a predetermined negative pressure is applied to the cavity region through the opening in the cup structure. The cup structure is configured to be in a resting position without the predetermined negative pressure being applied to the cavity region of the cup structure. The vacuum cup assembly has a first shape in the resting position and a second shape in the gripping position, the first shape being different from the second shape.

In another form, which may be combined with or separate from the other forms disclosed herein, a method of lifting an object is provided. The method includes providing a vacuum cup assembly, where the vacuum cup assembly includes a cup structure defining an opening at a proximal end and a recess at a distal end. The cup structure defines a cavity region between the proximal and distal ends, the cavity region defining at least one cavity. The opening is in fluid communication with the recess and with the cavity region. A plurality of inner structures is disposed in the cavity region. The method further includes disposing the distal end of the vacuum cup assembly in contact with the object to at least partially close the recess between the vacuum cup assembly and the object in an initial position of the vacuum cup assembly. The method includes applying a predetermined negative pressure through the opening, into the cavity region, and into the recess to conform the vacuum cup assembly to the object and to hold the object in a gripping position of the vacuum cup assembly.

Additional features may be provided, including but not limited to the following: wherein the plurality of inner structures includes a first layer and a second layer; wherein the cup structure is formed of a first material; the first material being flexible; wherein the first and second layers are formed of a second material; the second material being stiffer than the first material; the vacuum cup assembly having a first stiffness in the resting position and a second stiffness in the gripping position; the second stiffness being greater than the first stiffness; the vacuum cup assembly further including a flexible layer formed of the first material; the flexible layer being disposed between the first and second layers in the cavity region; the flexible layer dividing the cavity region into a first cavity in which the first layer is disposed and a second cavity in which the second layer is disposed; the first layer defining a first aperture through a center of the first layer; the second layer defining a second aperture through a center of the second layer; the flexible layer defining a third aperture through a center of the flexible layer; the first, second, and third apertures cooperating to form a channel connecting the opening to the recess; the flexible layer and at least one of the first and second layers defining an air gap therebetween in the rested position; the air gap being closed in the gripping position; the first and second layers being movable into a plurality of shapes to form a plurality of additional gripping positions; the first material being rubber; the second material being plastic; the cup structure having a frustoconical inner surface defining the recess; each of the first and second layers having a frustoconical main body portion and a plurality of legs extending from the frustoconical main body portion; and/or wherein the plurality of inner structures includes a plurality of granular bodies.

Further additional features may optionally be provided, including but not limited to the following: wherein the step of applying the negative pressure includes increasing a stiffness of the vacuum cup assembly; the method including providing an air gap between the flexible layer and at least one of the first and second layers in the initial position and closing the air gap in the gripping position; the method further comprising providing the vacuum cup assembly as being reconfigurable into a plurality of additional gripping positions based on corresponding shapes of a plurality of additional objects; and/or the step of applying the negative pressure further comprising moving the granular bodies within the cavity region to conform the cup structure to the shape of the object.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

The drawings herein are schematic in nature and are not necessarily drawn to scale or representative of the distances or relationships between the elements shown.

DETAILED DESCRIPTION

Figure 1:
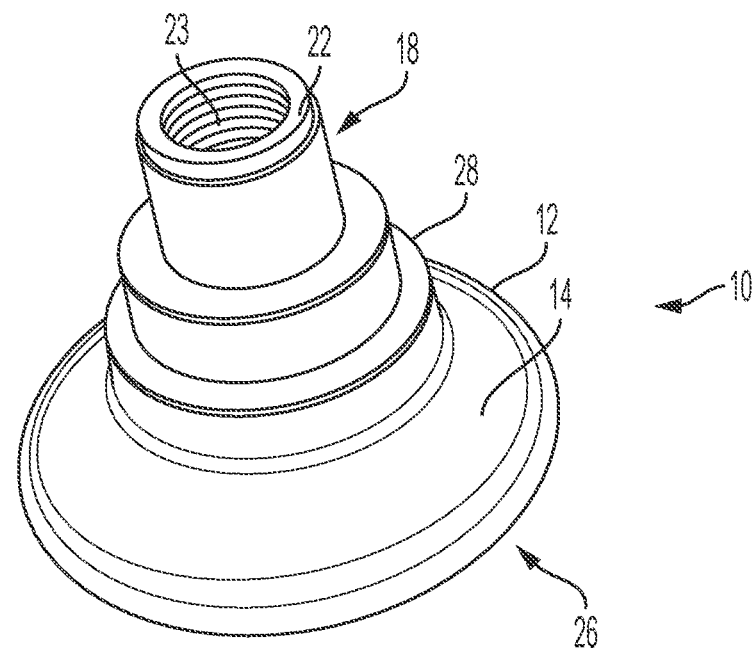
FIG. 1 is a perspective view of a vacuum cup assembly in a rested position, in accordance with the principles of the present disclosure.
Figure 2:
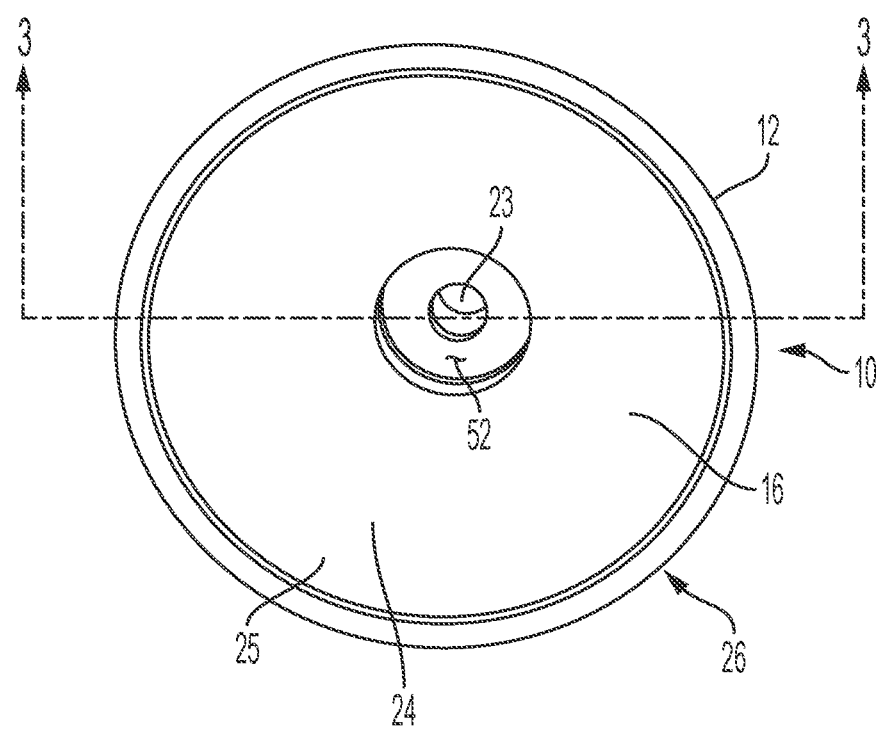
FIG. 2 is a perspective view of an under side of the vacuum cup assembly of FIG. 1 in the rested position, according to the principles of the present disclosure.
Figure 3:
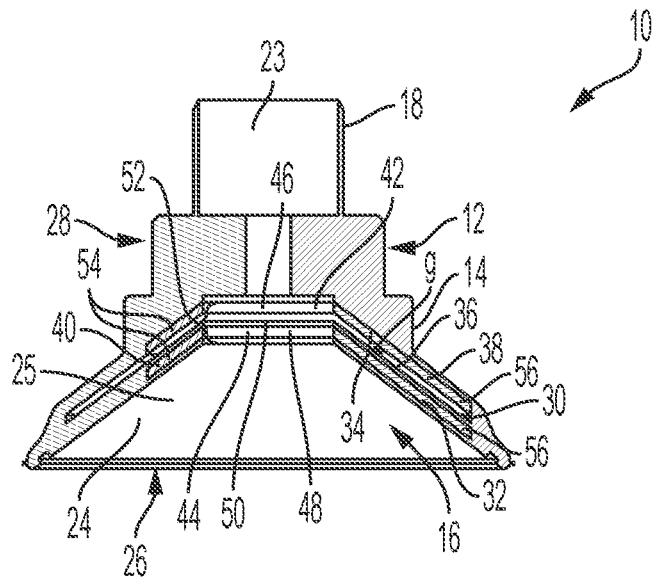
FIG. 3 is a cross-sectional view of the vacuum cup assembly of FIGS. 1 and 2 in the rested position, taking along the line 3-3 in FIG. 2, in accordance with the principles of the present disclosure.
Figure 4:
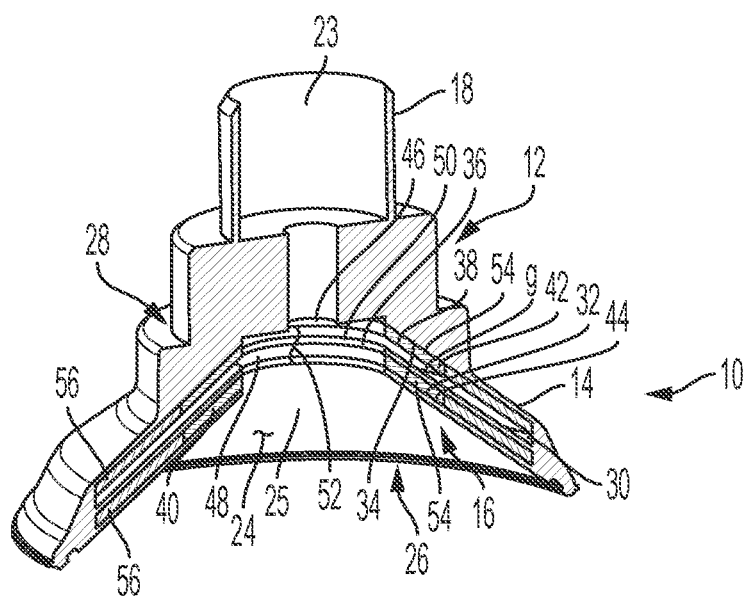
FIG. 4 is a cut-away perspective view of the vacuum cup assembly of FIGS. 1-3 in the rested position, according to the principles of the present disclosure.
Figure 5A:
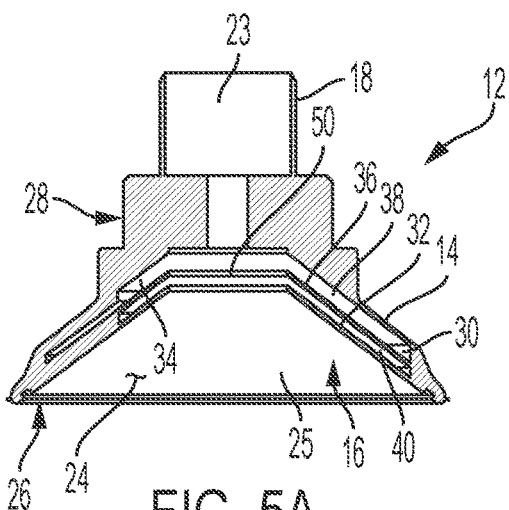
FIG. 5A is a cross-sectional view of a cup structure of the vacuum cup assembly of FIGS. 1-4, in accordance with the principles of the present disclosure.
Figure 5B:
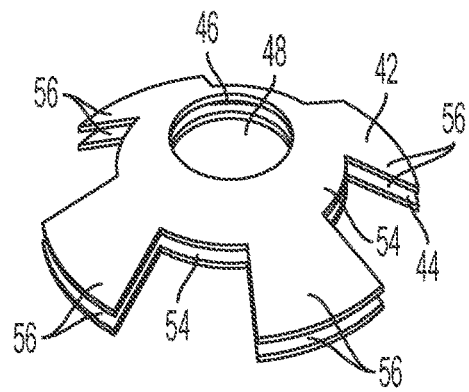
FIG. 5B is a perspective view of first and second layers of the vacuum cup assembly of FIGS. 1-4, according to the principles of the present disclosure.

The following description is merely exemplary in nature and is not intended to limit the present disclosure, application, or uses.

Referring now to FIGS. 1-6, wherein like numerals indicate like elements, a universal vacuum cup assembly is provided and generally indicated at 10. The vacuum cup assembly 10 includes a cup structure 12, which is formed of a first material, which is a flexible material, such as rubber. The cup structure 12 has an outer surface 14 and an inner surface 16. A proximal end 18 of the cup structure 12 is configured to be connected to a hose 20 (shown in FIG. 6), for example, through a threaded fitting 22 to apply a vacuum pressure, or negative pressure, through the vacuum cup assembly 10, which will be described in further detail below. The proximal end 18 defines an opening 23 that connects to the hose 20.

The inner surface 16 of the cup structure 12 has an outer side 25 that is frustoconical and that defines a recess 24 at a distal end 26 of the cup structure 12. In the alternative, the cup structure 12 could have other different shapes and surfaces, without falling beyond the spirit and scope of the present disclosure. The outer surface 14 may have steps 28.

The cup surface 12 defines a cavity region 30 defined by an inner side 32 of the inner surface 16 and inner side 34 of the outer surface 14 between the proximal and distal ends 18, 26. The cavity region 30 includes at least one cavity. In this example, a flexible layer 36 is included that divides the cavity region 30 into a first cavity 38 and a second cavity 40. The flexible layer 36 may be integrally formed with the cup structure 12 from the same material as the cup structure 12, the flexible layer 36 may be attached to the cup structure 12, or the flexible layer 36 may be a separate piece disconnected from the cup structure 12. The flexible layer 36 is preferably formed of a flexible material, such as rubber, but the flexible layer 36 does not necessarily need to be formed of the same material as the cup structure 12. The cavity region 30 is in fluid communication with the opening 23 and the with the recess 24.

A plurality of inner structures is disposed in the cavity region 30. In the example of FIGS. 1-6, the plurality of inner structures includes at least a first layer 42 and a second layer 44. The flexible layer 36, if included, is disposed between the first and second layers 42, 44 in the cavity region 30. The first layer 42 is disposed in the first cavity 38, and the second layer 44 is disposed in the second cavity 40. Although two layers 42, 44 are illustrated, additional layers may also be present, if desired. For example, three, four, five, or more layers may be used.

The first layer 42 defines a first aperture 46 through a center of the first layer 42, and the second layer 44 defines a second aperture 48 through a center of the second layer 44. Further, the flexible layer 36 defines a third aperture 50 through a center of the flexible layer 36. The first, second, and third apertures 46, 48, 50 cooperate to form a channel 52 connecting the opening 23 to the recess 24. The flexible layer 36 and at least one of the first and second layers 42, 44 define an air gap g therebetween in a rested position of the vacuum cup assembly 10. In this example, the air gap g is defined between the flexible layer 36 and the first layer 42, but it should be understood that that air gap g could alternatively be defined between the flexible layer 36 and the second layer 44, or air gaps g could exist between the flexible layer 36 and both of the first and second layers 42, 44.

In the illustrated example, each of the first and second layers 42, 44 includes a frustoconical main body portion 54 and a plurality of legs 56 extending from the frustoconical main body portion 54, however, it should be understood that a variety of other shapes and configurations of the first and second layers 42, 44 may be used without falling beyond the spirit and scope of the present disclosure. The first and second layers 42, 44 may be identical, as shown, or they may be different from one another.

The first and second layers 42, 44 are formed of a second material that may be stiffer than the first material from which the cup structure 12 is formed. For example, the second material may be plastic (e.g., thermoplastic), or a rubber that is stiffer than the rubber of the cup structure 12. When the vacuum cup assembly 10 is an initial, or rested, position, as shown in FIGS. 1-4, the air gap g exists between the first and second layers 42, 44, or at least the first and second layers 42, 44 are not being pressed together. With essentially no pressure being applied to the cavity region 30, the first and second layers 42, 44 have some flexibility, like the cup structure 12 itself.

Figure 6:
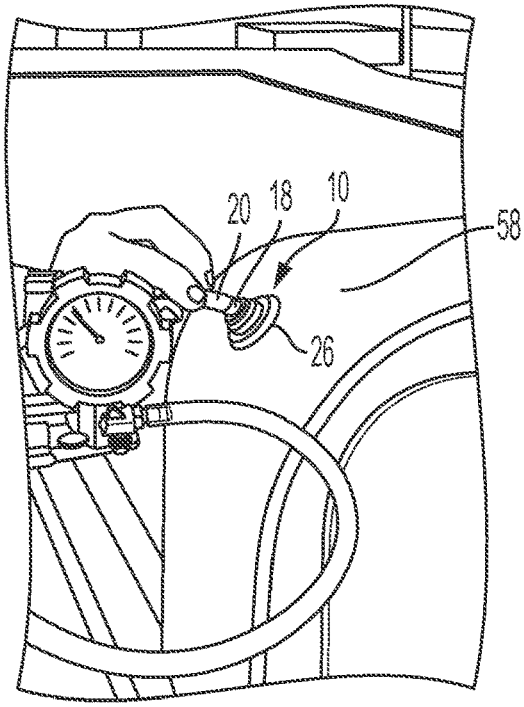
FIG. 6 is a schematic view of the vacuum cup assembly of FIGS. 1-4 applied to lift an object in a gripping position, in accordance with the principles of the present disclosure.
Figure 7:
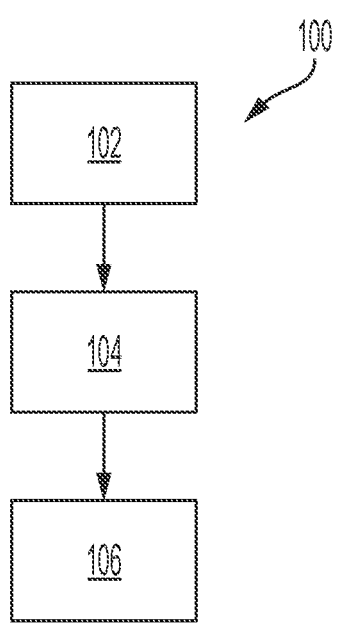
FIG. 7 is a block diagram illustrating a method of lifting an object, according to the principles of the present disclosure.

Referring now to FIGS. 6 and 7, with continued reference to FIGS. 1-4, a method 100 of lifting an object 58 is illustrated in a block diagram. The method 100 includes a step 102 of providing a vacuum cup assembly, such as the vacuum cup assembly 10 described above. The method 100 includes a step 104 of disposing the distal end 26 of the vacuum cup assembly 10 in contact with the object 58 to at least partially close the recess 24 between the vacuum cup assembly 10 and the object 58 in the initial or rested position of the vacuum cup assembly 10. Thus, the recess 24 enables the vacuum cup assembly 10 to create a suction with the object 58.

The method 100 further includes a step 106 of applying a predetermined negative pressure through the opening 23, into the cavity region 30, and into the recess 24 to conform the vacuum cup assembly 10 to the object 58 and to hold the object 58 in a gripping position of the vacuum cup assembly 10. For example, with reference to FIG. 6, the vacuum cup assembly 10 is in the gripping position and has conformed to the rounded shape of the object 58, as the negative pressure is being applied through the hose 20 and into the cavity region 30 and the recess 24 of the vacuum cup assembly 10.

The plurality of inner structures 42, 44, along with the cup structure 12, are configured to hold the cup structure 12 in a gripping position when at least a predetermined negative pressure is applied to the cavity region 30 through the opening 18 in the cup structure 12. On the other hand, the cup structure 12 is configured to be in the initial or resting position without the predetermined negative pressure being applied to the cavity region 30 of the cup structure 12, as shown in FIGS. 1-4. The vacuum cup assembly 10 has a first shape in the resting position (shown in FIGS. 1-4) and a second shape in the gripping position (shown in FIG. 6), the first shape being different from the second shape.

Thus, the vacuum cup assembly 10 has a first stiffness in the resting position (because the layers 42, 44 are not compressed together) and a second stiffness in the gripping position, the second stiffness being greater than the first stiffness. The greater stiffness is caused by a layer jamming effect between the first and second layers 42, 44. For example, as the layers 42, 44 are pressed together by the negative pressure, they are pressed together into a thicker combined structure that is stiffer. The air gap g that is defined between the first and second layers 42, 44 in the resting position is closed in the gripping position. Thus, the step 106 of applying the negative pressure includes increasing a stiffness of the vacuum cup assembly 10 as a whole.

The vacuum cup assembly 10 is universal because it can conform to a variety of object shapes by virtue of the inner layers 42, 44, which are shape-tunable in the sense that they can become stiffer as a whole when pressed together and the air gap g is eliminated between the layers 42, 44 in the cavity region 30 of the cup structure 12. Thus, the vacuum cup assembly 10 is reconfigurable into a plurality of additional gripping positions based on corresponding shapes of a variety of additional objects. The vacuum cup assembly 10 has flexible geometry for initial contact with the object 58, and then the flexible geometry conforms to the shape of the object 58 and stiffens to lift the object 58.

Figure 8:
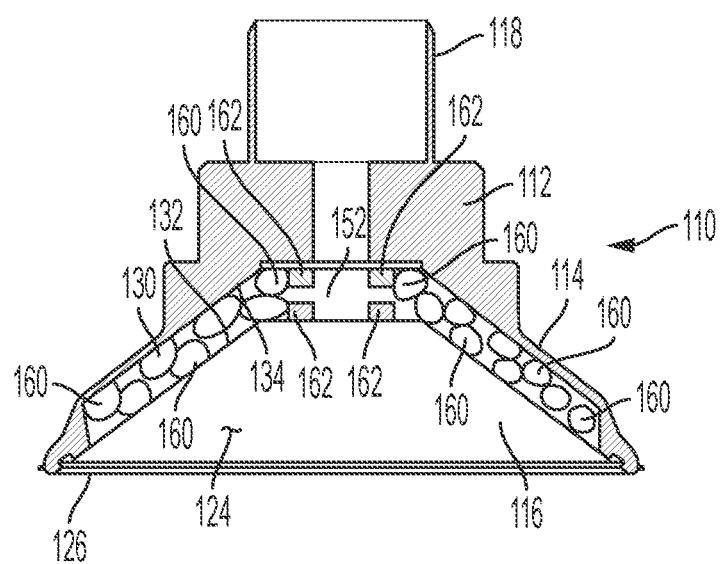
FIG. 8 is a cross-sectional view of another variation of a vacuum cup assembly, in accordance with the principles of the present disclosure.

Referring now to FIG. 8, another variation of a vacuum cup assembly is illustrated and generally designated at 110. The vacuum cup assembly 110 may be the same or similar to the vacuum cup assembly 10, and having all of the same properties and features thereof, except where described as being different. For example, the vacuum cup assembly 110 may include a cup structure 112 having an outer surface 114 and an inner surface 116 defining a recess 124. A proximal end 118 of the cup structure 112 is configured to be connected to a hose (not shown, but for example, as shown in FIG. 6), and a distal end 126 is configured to grip an object.

The cup surface 112 defines a cavity region 130 defined by an inner side 132 of the inner surface 116 and inner side 134 of the outer surface 114 between the proximal and distal ends 118, 126 of the cup structure 112. A plurality of inner structures is disposed in the cavity region 130, and in this case, the plurality of inner structures includes a plurality of granular bodies 160. In this example, the cup structure 112 defines edge lips 162 at edges of the cavity 130 and adjacent to the passage 152 through the vacuum cup assembly 110 to keep the bodies 160 from escaping the cavity 130.

The granular bodies 160 may be round, such as spherical or ovoid, or they may have any other desired shape, prism or pyramidal, or having a triangular cross-section, by way of example. The bodies 160 may be stiffer or less stiff than the flexible material of which the cup structure 112 is formed.

Thus, the plurality of inner structures can be granular, such as the bodies 160, or they can be layered material, such as the layers 42, 44. In some variations, both layered material 42, 44 and granular material (such as bodies 160) may be provided.

The method 100 may also be applied using the vacuum cup assembly 110 of FIG. 8. The step of applying the negative pressure 106 would include moving the granular bodies 160 within the cavity region 130 to conform the cup structure 112 to the shape of the object.

The description is merely exemplary in nature and variations are intended to be within the scope of this disclosure. The examples shown herein can be combined in various ways, without falling beyond the spirit and scope of the present disclosure. Such variations are not to be regarded as a departure from the spirit and scope of the present disclosure.

What is claimed is:

1. A vacuum cup assembly comprising:
 a cup structure defining an opening at a proximal end and a recess at a distal end, the cup structure is formed of a first material, the first material being flexible, the cup structure defining a cavity region between the proximal and distal ends, the cavity region including at least one cavity, the opening being in fluid communication with the recess and with the cavity region;
 a plurality of inner structures disposed in the cavity region, the plurality of inner structures being configured to hold the cup structure in a gripping position when at least a predetermined negative pressure is applied to the cavity region through the opening in the cup structure, the cup structure configured to be in a resting position without the predetermined negative pressure being applied to the cavity region of the cup structure, the vacuum cup assembly having a first shape in the resting position and a second shape in the gripping position, the first shape being different from the second shape, wherein the plurality of inner structures includes a first layer and a second layer; and
 a flexible layer formed of the first material, the flexible layer being disposed between the first and second layers in the cavity region.

2. The vacuum cup assembly of claim 1, wherein the first and second layers are formed of a second material that is stiffer than the first material, the vacuum cup assembly having a first stiffness in the resting position and a second stiffness in the gripping position, the second stiffness being greater than the first stiffness.

3. The vacuum cup assembly of claim 2, the flexible layer dividing the cavity region into a first cavity in which the first layer is disposed and a second cavity in which the second layer is disposed.

4. The vacuum cup assembly of claim 3, the first layer defining a first aperture through a center of the first layer, the second layer defining a second aperture through a center of the second layer, and the flexible layer defining a third aperture through a center of the flexible layer, the first, second, and third apertures cooperating to form a channel connecting the opening to the recess.

5. The vacuum cup assembly of claim 1, the flexible layer and at least one of the first and second layers defining an air gap therebetween in the rested position, the air gap being closed in the gripping position.

6. The vacuum cup assembly of claim 5, the gripping position being a first gripping position, the first and second layers being movable into a plurality of shapes to form a plurality of additional gripping positions.

7. The vacuum cup assembly of claim 5, the first material being rubber.

8. The vacuum cup assembly of claim 7, the second material being plastic.

9. The vacuum cup assembly of claim 5, the cup structure having a frustoconical inner surface defining the recess.

10. The vacuum cup assembly of claim 9, each of the first and second layers having a frustoconical main body portion and a plurality of legs extending from the frustoconical main body portion.

11. The vacuum cup assembly of claim 1, wherein the plurality of inner structures includes a plurality of granular bodies.

12. A method of lifting an object, the method comprising:
providing a vacuum cup assembly comprising:
    a cup structure defining an opening at a proximal end and a recess at a distal end, the cup structure being formed of a first material, the first material being flexible, the cup structure defining a cavity region between the proximal and distal ends, the cavity region defining at least one cavity, the opening being in fluid communication with the recess and with the cavity region; and
    a plurality of inner structures disposed in the cavity region;
disposing the distal end of the vacuum cup assembly in contact with the object to at least partially close the recess between the vacuum cup assembly and the object in an initial position of the vacuum cup assembly;
providing the plurality of inner structures as including a first layer and a second layer;
applying a predetermined negative pressure through the opening, into the cavity region, and into the recess to conform the vacuum cup assembly to the object and to hold the object in a gripping position of the vacuum cup assembly; and
providing the vacuum cup assembly as having a flexible layer disposed between the first and second layers in the cavity region, the flexible layer being formed of the first material.

13. The method of claim 12, further comprising:
providing the first and second layers as being formed of a second material that is stiffer than the first material,
wherein the step of applying the predetermined negative pressure includes increasing a stiffness of the vacuum cup assembly.

14. The method of claim 13, further comprising providing the first layer as defining a first aperture through a center of the first layer, the second layer as defining a second aperture through a center of the second layer, and the flexible layer as defining a third aperture through a center of the flexible layer, the first, second, and third apertures cooperating to form a channel connecting the opening to the recess.

15. The method of claim 14, further comprising:
providing an air gap between the flexible layer and at least one of the first and second layers in the initial position; and
closing the air gap in the gripping position.

16. The method of claim 15, the gripping position being a first gripping position, the method further comprising providing the vacuum cup assembly as being reconfigurable into a plurality of additional gripping positions based on corresponding shapes of a plurality of additional objects.

17. The method of claim 12, further comprising providing the plurality of inner structures as being a plurality of granular bodies, the step of applying the negative pressure further comprising moving the granular bodies within the cavity region to conform the cup structure to the shape of the object.

* * * * *